United States Patent [19]
Morisada

[11] Patent Number: 5,175,827
[45] Date of Patent: Dec. 29, 1992

[54] BRANCH HISTORY TABLE WRITE CONTROL SYSTEM TO PREVENT LOOPING BRANCH INSTRUCTIONS FROM WRITING MORE THAN ONCE INTO A BRANCH HISTORY TABLE

[75] Inventor: Tsuyoshi Morisada, Tokyo, Japan

[73] Assignee: NEC Corporation, Tokyo, Japan

[21] Appl. No.: 610,443

[22] Filed: Nov. 9, 1990

Related U.S. Application Data

[63] Continuation of Ser. No. 146,740, Jan. 21, 1988, abandoned.

[30] Foreign Application Priority Data

Jan. 22, 1987 [JP] Japan ............................. 62-11343

[51] Int. Cl.⁵ .............................................. G06F 9/32
[52] U.S. Cl. ............................. 395/375; 364/DIG. 1; 364/261.3; 364/262; 364/262.4; 364/262.5; 364/262.3
[58] Field of Search .............. 395/375, 400, 425, 700, 395/775

[56] References Cited

U.S. PATENT DOCUMENTS

| | | | |
|---|---|---|---|
| 3,559,183 | 1/1971 | Sussenguth | 364/200 |
| 4,370,711 | 1/1983 | Smith | 364/200 |
| 4,477,872 | 10/1984 | Losq et al. | 364/200 |
| 4,604,691 | 8/1986 | Akagi | 364/200 |
| 4,679,141 | 7/1987 | Pomerene et al. | 364/200 |
| 4,763,245 | 8/1988 | Emma et al. | 364/200 |
| 4,764,861 | 8/1988 | Shibuya | 364/200 |
| 4,853,840 | 8/1989 | Shibuya | 364/200 |

FOREIGN PATENT DOCUMENTS

PCT/JP87/0-
0122 9/1987 PCT Int'l Appl.

Primary Examiner—Kevin A. Kriess
Attorney, Agent, or Firm—Foley & Lardner

[57] ABSTRACT

A system for executing computer instructions, having an improved branch history table. The system writes both branch instruction addresses and branch destination addresses into the branch history table on the basis of the result of an execution of a branch instruction. The system recognizes repeated execution of a series of instructions or that "looping" is occurring. The system then during "looping" allows writing into the branch history table only the first time and prevents continuous writing during looping.

6 Claims, 7 Drawing Sheets

BRANCH HISTORY TABLE WRITE CONTROL SYSTEM TO PREVENT LOOPING BRANCH INSTRUCTIONS FROM WRITING MORE THAN ONCE INTO A BRANCH HISTORY TABLE

This application is a continuation of application Ser. No. 07/146,740, filed Jan. 21, 1988, now abandoned.

BACKGROUND OF THE INVENTION

The present invention relates to a branch history table (BHT) write control system for controlling writing into a branch history table in an advanced-control type data processor.

When executing a branch instruction, generally the advanced control of the branch destination address determines the performance of the data processor. For this reason, taking note of the fact that the branching direction frequently is the same as the result of a branch prediction executed in the past, there is proposed a technique by which a branch instruction address and an executed-branch-destination-address are stored in a pair in a BHT and the branch instruction address is identified by searching the BHT without having to calculate the branch destination address. For details of this technique, reference may be made to the U.S. Pat. Nos. 3,559,183 and 4,604,691.

Into this BHT is stored a branch destination address identified at the arithmetic execution stage of a branch instruction. Searching of this BHT is done at the instruction prefetch stage preceding the arithmetic execution stage.

Where an instruction stream consisting of a sequence of instructions is to be subjected to advanced control, registration in the BHT by a foregoing instruction and searching of the BHT by a subsequent instruction are in conflict with each other. A random access memory for realizing a BHT usually does not permit searching during registration. For this reason, where the branch instruction is loop-conscious, as is a branch-on-count (BCT)-instruction, there is the disadvantage that the instruction prefetching action of a stream including a branch instruction, depending on the number of loopable instructions in the stream, comes into conflict with the registering action into the BHT, the latter being given priority to prevent searching of the BHT.

SUMMARY OF THE INVENTION

An object of the present invention is, therefore, to obviate the aforementioned disadvantage, and provide a BHT write control system for use in an advanced control type data processor, wherein the branching performance of the loop is improved by preventing useless registration into the BHT.

According to one aspect of the invention, there is provided a system for advanced control of instructions, having a BHT storing a branch instruction address and a branch destination address of the branch instruction in a pair, including write indicating means for producing a write indicating signal to indicate writing of a branch destination address into the BHT on the basis of the result of execution of a branch instruction; repetitive execution display means for producing a repetitive execution display signal indicating that a series of instruction streams are being repetitively executed; and restraining means responsive to an execution display signal from the repetitive execution display means for preventing a write indicating signal from the write indicating means from being outputted as a BHT-enable signal.

BRIEF DESCRIPTION OF THE DRAWINGS

Other features and advantages of the present invention will be apparent from the detailed description hereunder taken in conjunction with the accompanying drawings, in which:

In FIGS. 1 to 11, the same reference numerals represent respectively the same structural elements.

DETAILED DESCRIPTION OF A PREFERRED EMBODIMENT

Figure 1:
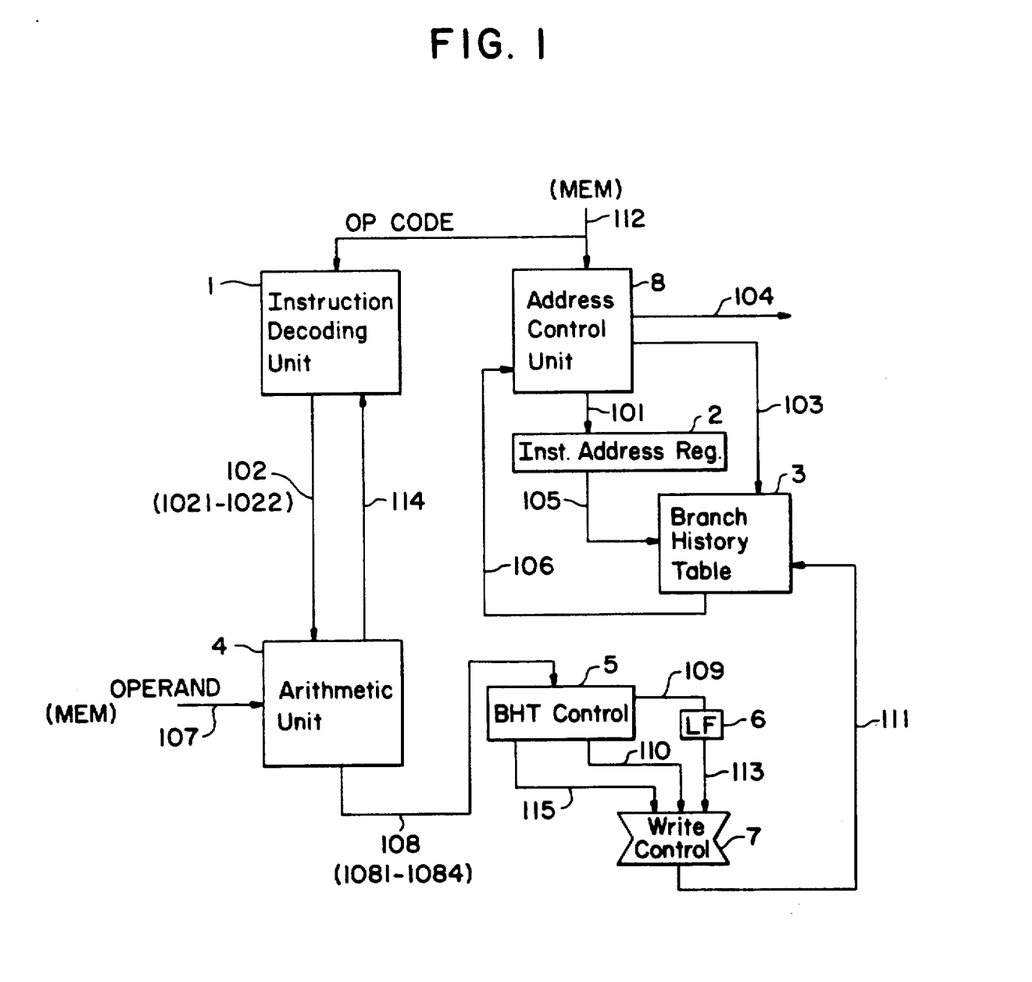
FIG. 1 illustrates a preferred embodiment of the invention.

Now the invention will be described in detail with reference to the drawings. Referring to FIG. 1, an embodiment of the invention has an instruction decoding unit 1 for decoding an instruction in an instruction word given from a memory unit (not shown) via a signal line 112, supplying the result of decoding to a signal line 102 and receiving the result of branching given via a signal line 114.

Figure 2:
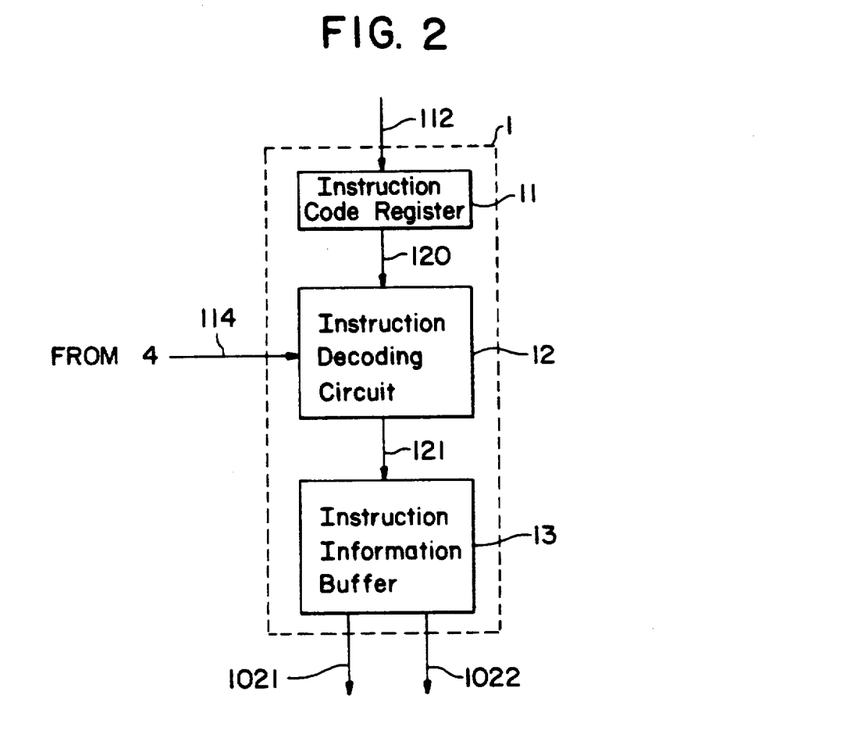
FIG. 2 illustrates the detailed structure of the instruction decoding unit 1 of FIG. 1.

Referring now to FIG. 2, the instruction decoding unit 1 is provided with an instruction code register 11 for storing the instruction code of the instruction word transmitted from the memory unit (not shown) via the signal line 112, and an instruction decoding circuit 12 for sending out to a line 121 instruction information indicating the type of the instruction on the basis of the instruction code given from the instruction code register 11 by way of a signal line 120 and, at the same time, evaluating the failure of a foregoing prediction on the basis of the result of analysis, given via the signal line 114, to start decoding an instruction in the correct branching direction. Also provided is an instruction information buffer 13 for storing the instruction information and branch-related information from the instruction decoding circuit 12 until the time of the execution of the instruction and, in response to the execution of the instruction, outputting the instruction information and branch-related information to lines 1021 and 1022.

Next, before describing an arithmetic unit 4 for executing an instruction and confirming a branch prediction in accordance with the indication of the instruction information from the instruction information buffer 13, the advanced control of addresses, accomplished by the use of a branch history table (BHT) 3, will be explained in detail.

Referring to FIG. 1, an address control unit 8 for performing advanced control of addresses sends out on a line 101 an instruction address identified on the basis of the instruction word provided from the memory unit (not shown) via the line 112 and a branch destination address supplied from the BHT 3 via a line 106; sends out the branch destination address on a line 103; and sends out an instruction prefetch or operand prefetch dress to the memory unit (not shown) by way of a line 4.

An instruction address register 2 stores the instruction prefetch address or a branch instruction address ven from the address control unit 8 through the line 1, and sends it out on a line 105. The BHT 3, when ing searched, sends out a predicted branch destination address to the address control unit 8 via the line 106 response to the instruction prefetch address provided om the instruction address register 2 via the line 105. his instruction address register 2, when performing gistration, registers the branch destination address pplied from the address control unit 8 via the line 103 a position indicated by the branch instruction address ovided via the line 105 and in response to an enable gnal given through a line 111. For details on the address control unit 8, instruction address register 2 and HT 3, reference may be made to the specification of e International application Ser. No. PCT/JP87/00122 ed by the same applicant on Feb. 26, 1987.

Now will be described in detail the generation of the nable signal sent out on the line 111, which constitutes significant feature of the present invention.

Figure 3:
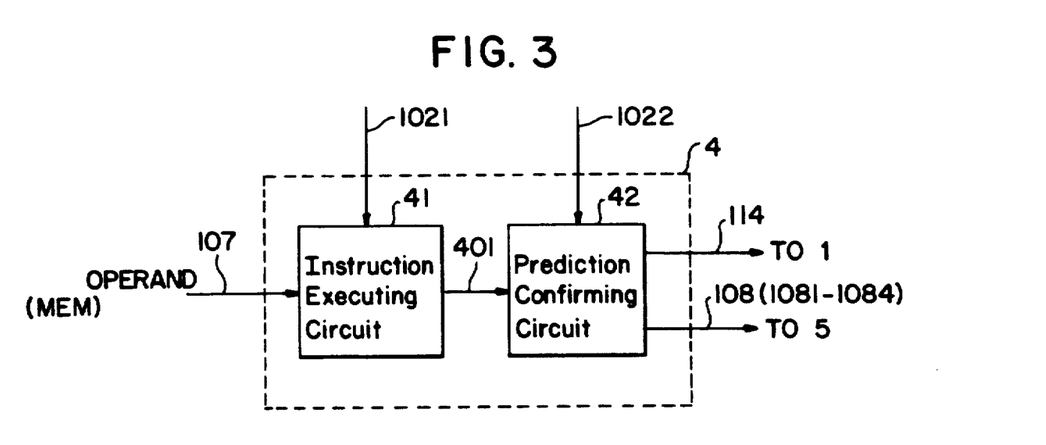
FIG. 3 illustrates the detailed structure of the arithmetic unit 4 of FIG. 1.

First will be described the arithmetic unit 4, which is e source of this signal. Referring to FIG. 3, the arithetic unit 4 is equipped with an instruction executing rcuit 41 for executing the arithmetic operation of erands supplied from the memory unit (not shown) a a line 107 as indicated by the instruction information ovided via the line 1021, and a prediction confirming rcuit 42 for processing the result of execution given om this instruction executing circuit 41 through a line 1 with branch-related information to evaluate the anch prediction.

This prediction confirming circuit 42 supplies lines 14 d 108 (1081-1084) with the type of the branching struction provided via the line 1022 and information dicating a failure in branch prediction or a branch irection, obtained by the evaluation of the branch rediction under advanced control. To the lines 114 and 081 is transmitted a signal indicating a failure in branch rediction. To the line 1082 is transmitted a branch-on-ount (BCT)-instruction executing signal, which is a op branch instruction for branching a prescribed number of times in the same direction, followed by branching in another direction. To the line 1083 is transmitted signal indicating prediction not using the BHT 3. To he line 1084 is transmitted a signal indicating that the irection of the branching result is on the branch (GO) ide.

Figure 4:
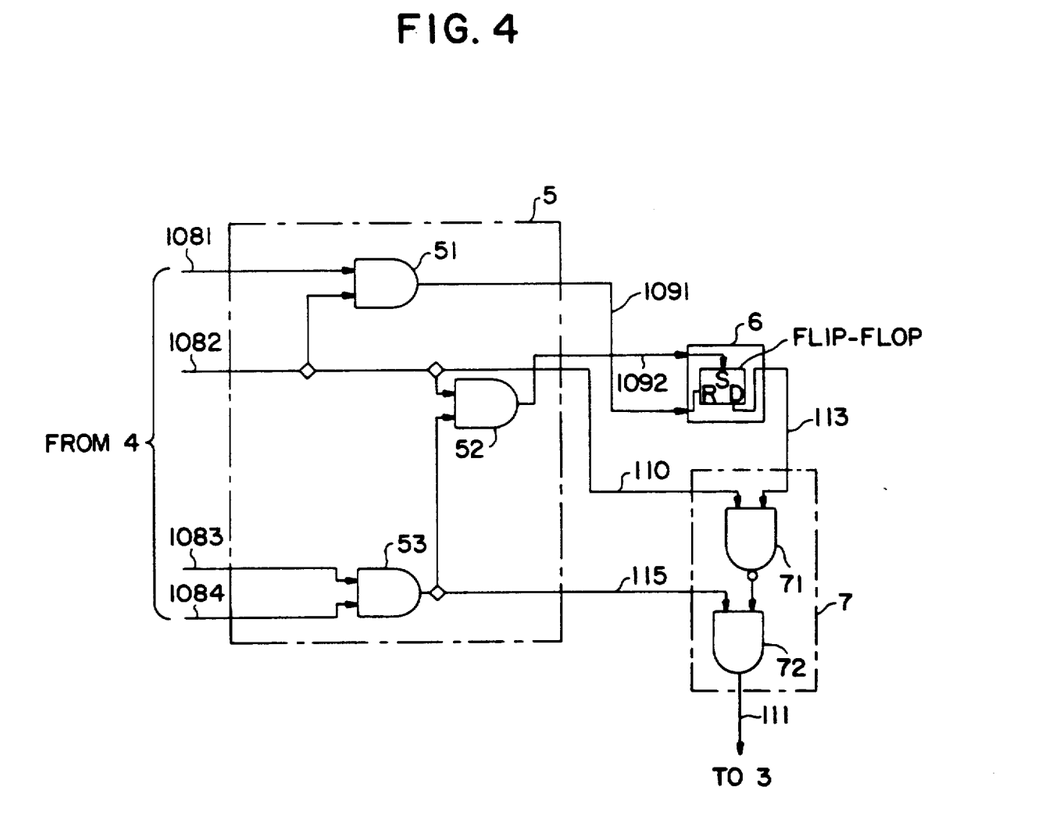
FIG. 4 illustrates the detailed structure of the branch history table control circuit 5, loop flag circuit 6 and BHT control circuit 7 of FIG. 1.

Referring now to FIG. 4, a BHT control circuit 5 btains, with the use of an AND gate or write indicating circuit 53, the logical product of the signal indicating prediction not using the BHT 3, given via the line 083, and the signal indicating the branching result, rovided via the line 1084, to be on the branch (GO) ide, generates a branch destination write indicating ignal on a line 115. The BHT control circuit 5 obtains, vith the use of an AND gate 52, the logical product of his write indicating signal and the BCT instruction xecuting signal supplied via the line 1082, and sets a op flag circuit or repetitive execution display 6 indiating the repetition of the loop. Therefore, the output f the AND gate 52 serves as a loop start signal. This op flag circuit 6 is reset by a signal resulting from the btainment of the logical product of the BCT-instruction executing signal and a branch prediction failure ion signal supplied via line 1081 with the use of AND gate 51. Therefore, the output of the AND gate 52 is a loop end signal. Incidentally, the BHT control circuit 5 outputs intact the BCT-instruction executing signal, provided by way of the line 1082, on a line 110.

In a write control circuit 7, a non-conjunction of the BCT-instruction executing signal given through the line 110 and a loop flag set indicating a signal provided by way of a line 113 is obtained with a NAND gate 71. The logical product of the output of this NAND gate 71 and the write indicating signal supplied via the line 115 is given from an AND gate 72, whose output serves as the enable signal for the BHT 3 via the line 111.

A set indicating signal for the loop flag circuit 6 indicates that the BCT-instruction is being executed, i.e. the loop is executed repetitively, and the outputting of this set indicating signal restrains the generation of the enable signal in response to the indication of a write signal provided via the line 115. The reason why the generation of the enable signal has to be so restrained will be explained below by way of an example of instruction stream.

First, the operation of the embodiment of the invention will be described in detail with reference to accompanying drawings taking a first instruction stream as an example.

Figure 5:
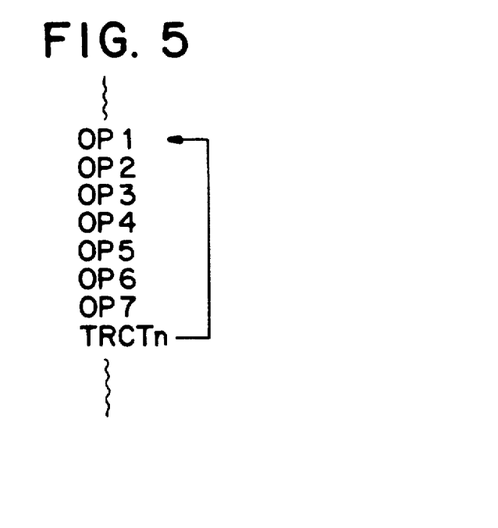
FIGS. 5 to 11 are diagrams for describing instruction streams applicable to the embodiment of the invention and the operation thereof.

Referring to FIG. 5, an instruction stream comprises seven instructions OP1 to OP7 and a branch instruction TRCTn.

Figure 6:
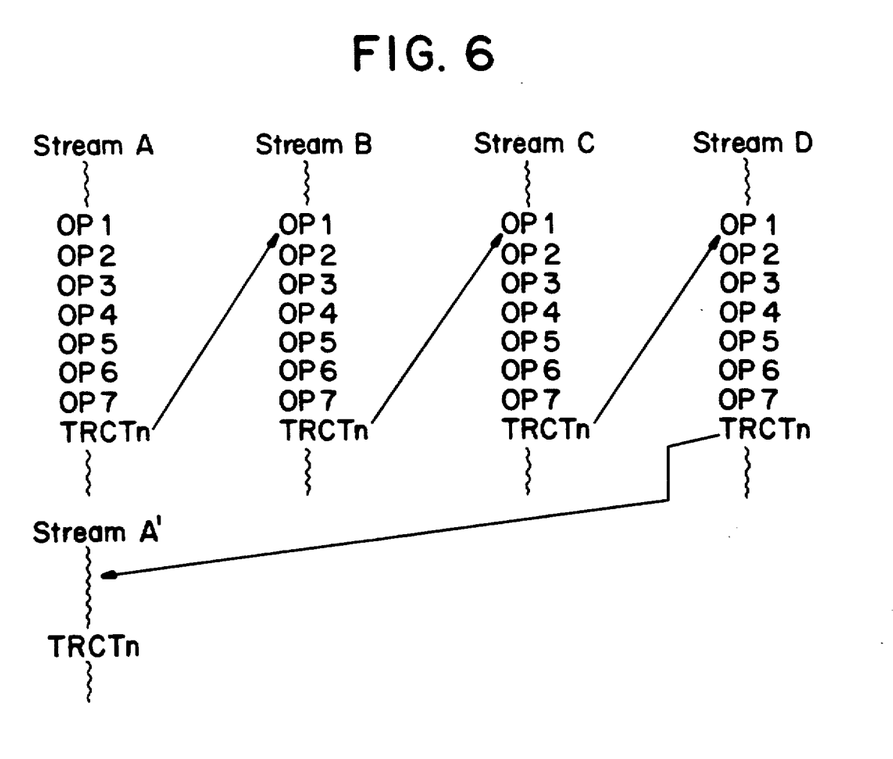

Referring to FIG. 6, suppose that the execution of the instruction stream shown in FIG. 5 is repeated four times or more. In stream A, which represents the first execution, the initial value is stored in a position corresponding to the address of the branch instruction TRCTn in the BHT 3 of FIG. 1. Therefore, the address of the branch destination instruction has to be stored in the BHT 3.

Meanwhile, upon decoding of the branch instruction TRCTn of stream A, instructions of stream B, which represents the second execution, are prefetched without waiting for the result of execution of the branch instruction TRCTn.

Figure 7:
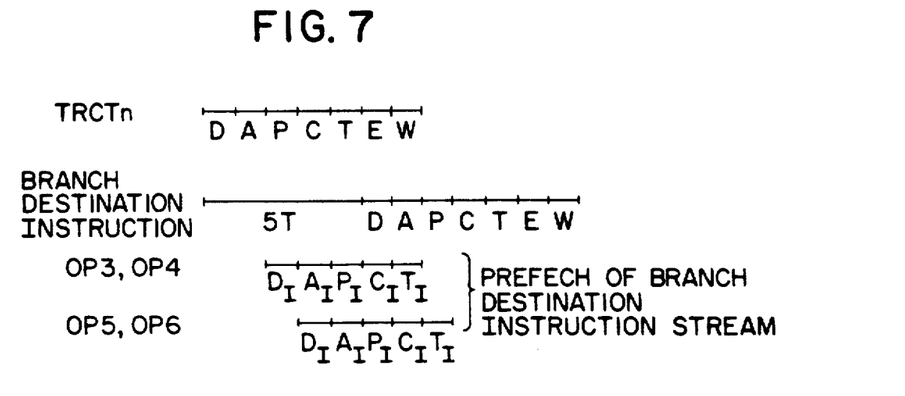

Referring to FIG. 7, stream A's branch instruction TRCTn itself prefetches two words of instructions, i.e., the instructions OP1 and OP2 of stream B. At the same time, the four instructions, OP3, OP4, OP5 and OP6, following the instructions OP1 and OP2, are also prefetched.

Referring again to FIG. 6, streams B, C and D, respectively representing the the second, third and fourth executions, are prefetched in the same operation. For these prefetches the BHT 3 is used. Thus, the same branch destination address is repetitively registered because the branching direction is often in the same direction as the results of branch predictions executed in the past. In the example illustrated in FIG. 6, the branch destination addresses of the branch instructions TRCTn of streams A, B and C are the instruction address of the same instruction OP1. A feature of the invention consists in avoiding, in view of this loop, the repetition of registration of the same branch destination address into the BHT.

Figure 8:
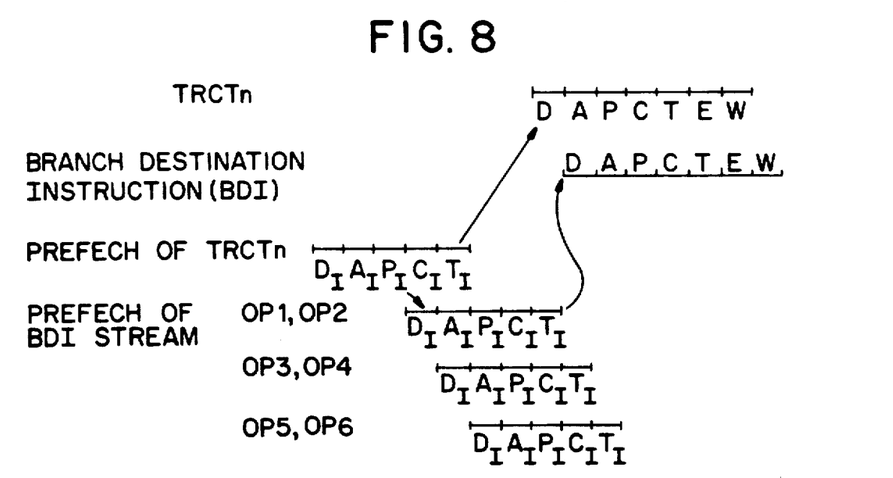

Next will be explained with reference to FIG. 8 advanced control on a pipe line when branching is predicted.

First, a prefetch of the branch instruction TRCTn of instruction stream A is started at a decode stage $D_I$, and a branch destination address is made definitive at an address generation stage $A_I$. The BHT 3 is searched at a paging stage P_f to confirm the presence of a branch destination address and take it out. From the immediately following stage on, the predicted-branch-destination instruction is prefetched. Immediately after the transfer stage where the prefetched-branch-destination instruction is transferred from a cache memory, the execution stage for the branch destination instruction can be initiated. This entails a delay of one machine cycle from the execution stage of the branch instruction.

Figure 9:
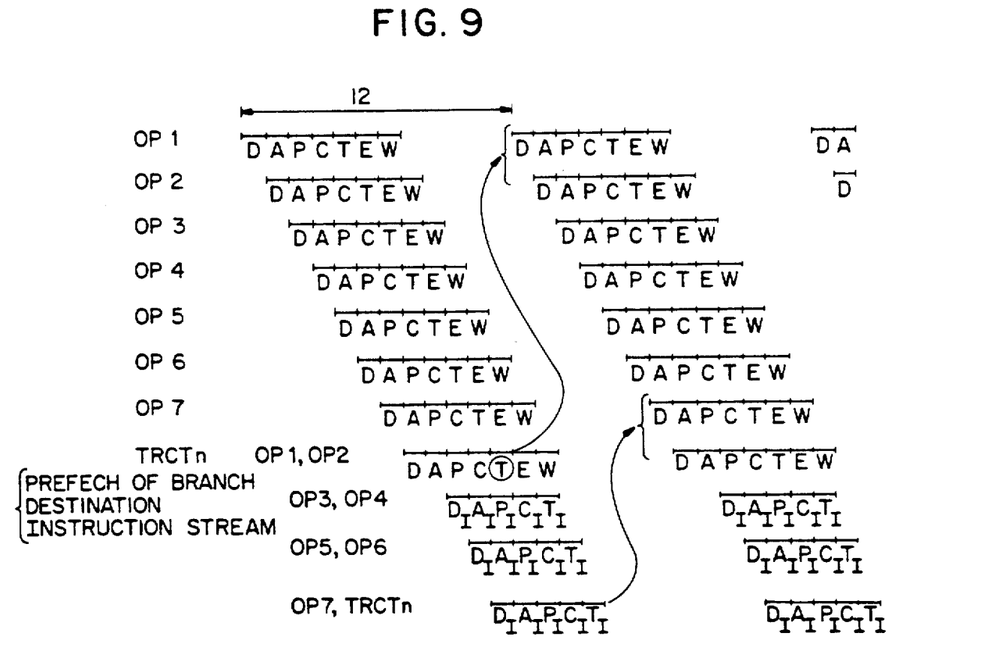

Next will be described in detail, with reference to FIG. 9, the operation which takes place where the instruction stream shown in FIG. 5 is looped without branch prediction. Prefetching in this instruction stream is achieved such that two instructions OP1 and OP2 are first prefetched at the branch instruction TRCTn, and then two instructions at a time, OP3 and OP4, OP5 and OP6, and OP7 and TRCTn are prefetched.

The execution pipe line for the branch destination instruction OP1 is started in response to the completion of the transfer of the branch destination instruction OP1 from the cache at the branch instruction TRCTn. Therefore, 12 machine cycles are required from the time the operation is started on the execution pipe line for instruction stream A until the start of the operation on the execution pipe line for the branch destination instruction.

Figure 10:
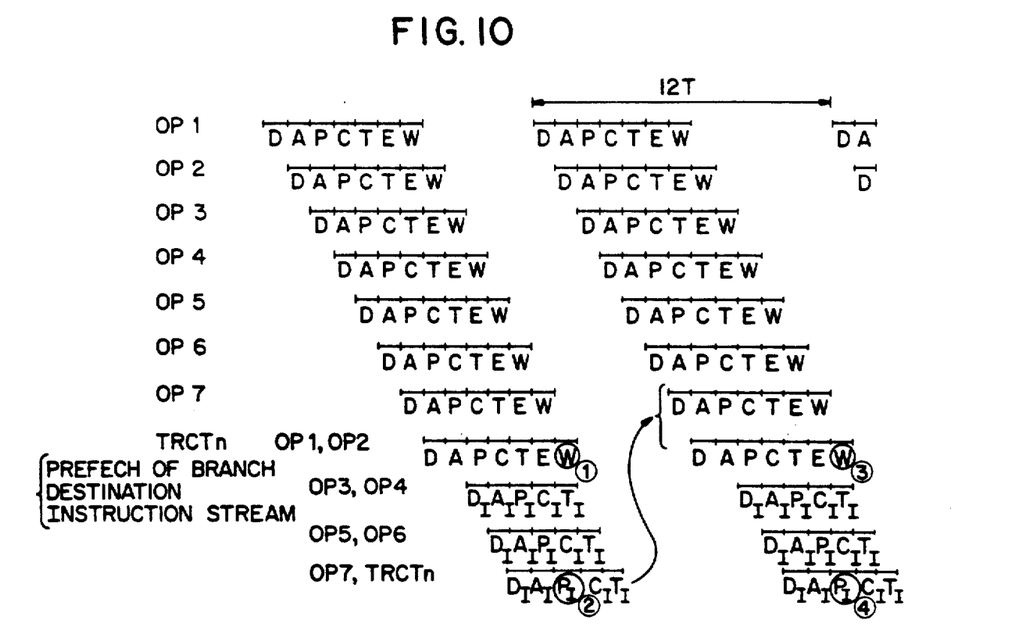

Referring now to FIG. 10, as the branch destination address of instruction stream A is absent in the BHT 3, it is written at the write stage (see ①). During this writing operation, the BHT 3 cannot be referred to by a prefetch operation at the branch instruction TRCTn of instruction stream B (see ②). Therefore, as the branch instruction TRCTn of stream B recognizes the absence of the branch destination address in the BHT 3, the same branch destination address is registered in the BHT 3 (see ③). Because of this registration, the branch instruction TRCTn of instruction stream C to be prefetched next also recognizes the absence of the branch destination address in the BHT 3, the same branch destination address is registered in the BHT 3. Therefore, on account of this repetition, 12 machine cycles are always needed between the start of the operation on the execution pipe line of the instruction stream including a branch instruction and that of the operation on the execution pipe line of the instruction stream including a branch destination instruction.

Now will be described in detail the operation of the embodiment of the invention with reference to FIG. 11.

Figure 11:
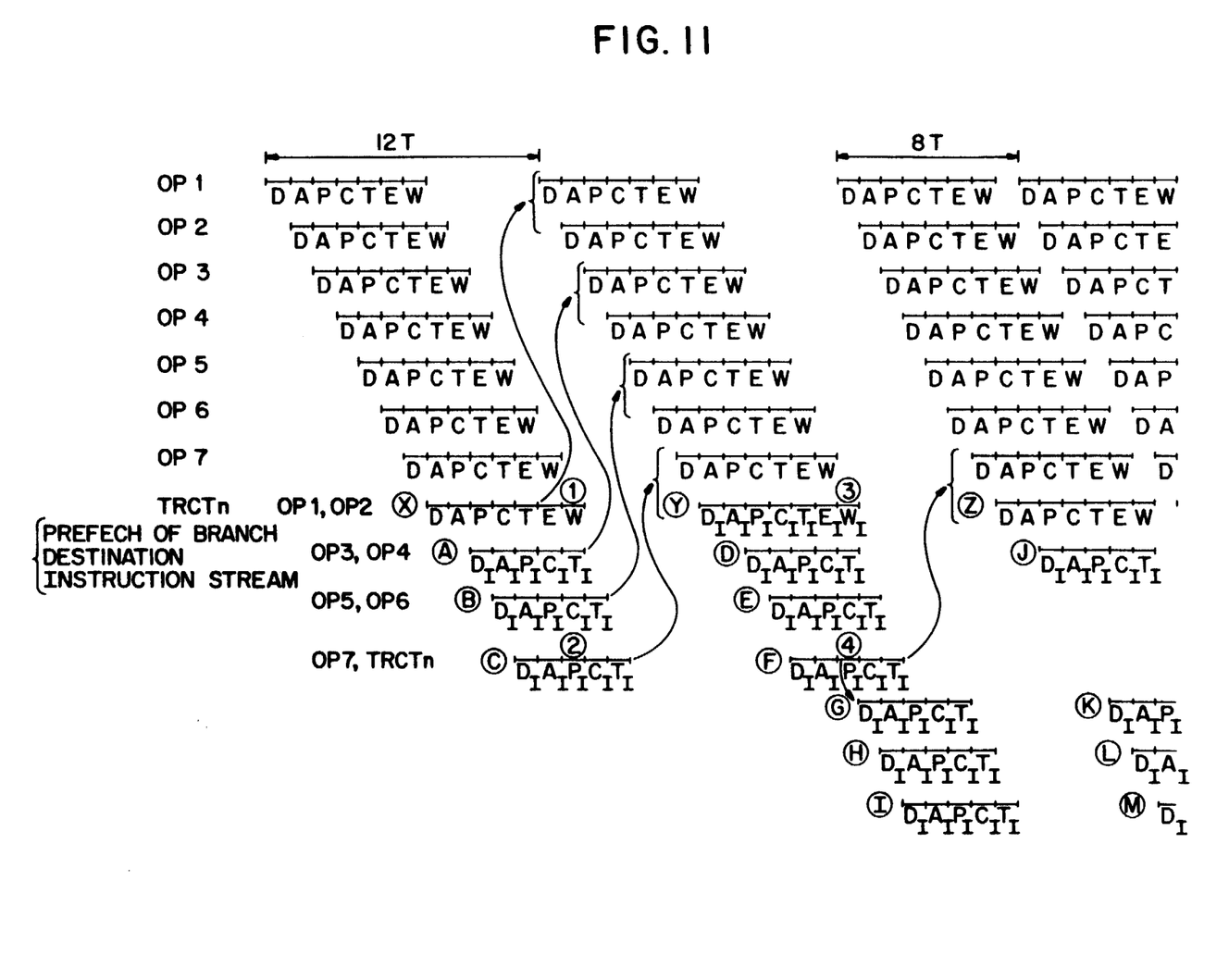

Referring to FIGS. 1, 6 and 11 together, the branch instruction TRCTn of the first instruction stream A achieves a prefetch Ⓧ of the branch destination instruction OP1 and the immediately following instruction OP2 of the second instruction stream B. At a transfer stage T of this prefetch pipe line Ⓧ, the branch destination instruction OP1 is read out of the cache memory. The branch destination instruction OP1 read out of the cache memory at this transfer stage begins the execution pipe line in the next machine cycle. The ensuring instructions OP3, OP4, OP5 and OP6 of instruction stream B operate on the execution pipe line, following instruction prefetch pipe lines Ⓐ and Ⓑ.

If an initial value is stored in a branch address destination address field of the BHT 3, the branch instruction TRCTn will recognize it at the paging stage P, so that a branch destination address generated by arithmetic operation at the execution stage E will be registered into the BHT 3 at the write stage W. This registering operation will come into conflict with the operation to search the BHT 3 at the paging stage P_1 of the prefetch pipe line Ⓒ for the branch instruction of instructio stream B including the branch destination instruction OP1. Since this conflict makes it impossible for the branch instruction TRCTn of instruction stream B to search the BHT 3 at the paging stage P_1 of the prefetch pipe line Ⓒ, it will recognize the absence of a branc destination address in the BHT 3. Therefore, as the branch instruction TRCTn of stream B recognizes the absence of a branch destination address in the BHT 3, it will attempt to register, at the write stage W of the execution pipe line, a branch destination address, which is the result of execution at the execution stage E, into the BHT 3.

This operation will be described in detail below with reference to FIG. 4.

First in executing the branch instruction TRCTn of stream A, the BHT control circuit 5, loop flag circuit 6 and write control circuit 7 operate as described below.

Referring to FIG. 4, a signal indicating a prediction not using the BHT 3 is provided via the signal line 1083. Thus, via the signal line 1083, there is supplied a signal indicating that the executed branch instruction calls for branching into an instruction other than the instruction indicated by a predicted branch destination address in the BHT 3. The logical product of this signal and a signal given through the line 1084 and indicating that the branching direction is on the branch (GO) side is obtained from the AND gate 53, and a signal indicating writing of a new branch destination is provided via the line 115. In the execution of the branch instruction TRCTn of the first stream or stream A, however, "0" is set as the initial value in the loop flag circuit 6. Therefore, the output of the NAND gate 71 will be "1", and the enable signal will be supplied from the AND gate 72 to the line 111. Along with this output, the BCT-instruction execution signal is provided via the line 1082, and the write signal for a new branch destination is outputted from the AND gate 52, so that a setting signal for the loop flag circuit 6 will be supplied from the AND gate 52. This setting signal sets the loop flag circuit 6 at "1".

Next will be explained the execution of the branch instruction TRCTn of stream B. Since the loop flag circuit 6 has been set by the execution of the branch instruction TRCTn of stream A, "1" is produced on the line 113. Meanwhile, in response to the execution of the branch instruction TRCTn of stream B, the BCT-instruction execution signal is provided on the line 1082, and accordingly it is produced as it is via the line 110. As a result, "0" is produced from the NAND gate 71, and the write signal for a new branch destination given via the line 115 is restrained by the AND gate 72, so that no enable signal is generated through the line 111. Incidentally, because the branch instruction TRCTn of the stream which is the final loop (not shown) is out of the loop repetition, there will b provided a branch-prediction-failure signal via the line 1081. Since, at this time, the BCT-instruction execution signal is given through the line 1082, a logical product is obtained from an AND gate 51 to produce "1", in response to which the loop flag circuit 6 is reset.

Referring now to FIG. 11, since the execution of the branch instruction TRCTn of stream B prevents registration into the BHT 3, the BHT 3 can be referred to at the paging stage of the prefetch pipe line Ⓕ for the branc instruction TRCTn of stream C. As a result, there is arted the operation of the prefetch pipe line (G) for the branch destination instruction OP1 of stream D. At the transfer stage of this prefetch pipe line (G) is taken out the branch destination instruction OP1 of stream D to start operation on the execution pipe line. However, since stream C has eight instructions and eight machine cycles are required on its pipe line, operation of the execution pipe line for the branch destination instruction OP1 of stream D cannot be started before the completion of the decoding stage D of the branch instruction TRCTn, which is the final instruction of stream C. Therefore, only eight machine cycles are needed from the time the operation on the execution pipe line of OP1, which is the first instruction of stream C, the third stream, is begun until the start of operation of OP1, the first instruction of stream D, the fourth stream, and faster achievement of processing is thereby made possible. The corresponding intervals from the fourth stream on need not be more than eight machine cycles each.

The present invention has the benefit of improving the loop branching performance by restraining useless writing into the branch history table while executing a loop.

What is claimed is:

1. A branch history table write control system for preventing useless instruction registration for use in an advanced control type data processor comprising:
   a branch history table for storing branch addresses;
   write indicating means for producing a write indicating signal to indicate writing of a branch destination address into said branch history table on the basis of a result of execution of a branch instruction;
   repetitive execution display means for producing a repetitive execution display signal indicating that a series of instruction streams are being repetitively executed; and
   restraining means responsive to said repetitive execution display signal for preventing said write indicating signal from being produced as a branch-history-table enable signal, wherein a branch destination address of said series of instruction streams is only registered once in said branch history table for a given repetitive execution.

2. A branch history table write control method for preventing useless instruction registration for use in an advance-control type data processor having a branch history table storing a branch instruction address and a branch destination address of the branch instruction in a pair, comprising the processor implemented steps of:
   producing a write indicating signal to indicate writing of a branch destination address into said branch history table on the basis of the result of execution of a branch instruction;
   producing a repetitive execution display signal indicating that a series of instruction streams are being repetitively executed; and
   preventing said write indicating signal from being produced as a branch-history-table enable signal in response to said execution display signal, wherein said series of instruction streams is only registered once.

3. A branch history table write control system as claimed in claim 1, wherein said branch history table stores both branch instruction addresses and branch destination addresses.

4. A branch history table write control system for preventing useless instruction registration and for use in an advance-control type data processor comprising:
   a branch history table for storing branch addresses;
   write indicating means indicating a branch destination address requires writing into said branch history table;
   a loop flag indicating repetitive execution of a series of instruction streams; and
   a write control means responsive to said loop flag for preventing said write indicating means from causing writing into said branch history table, wherein said series of instruction streams is only registered after said loop flag is reset.

5. A branch history table write control system as claimed in claim 4, wherein said branch history table stores both branch instruction addresses and branch destination addresses.

6. A branch history table write control system for use in an advanced-control type data processor comprising:
   a branch history table for storing branch addresses;
   write indicating means for producing a write indicating signal to indicate writing of a branch destination address into said branch history table on the basis of a result of execution of a branch instruction;
   repetitive execution display means for producing a repetitive execution display signal indicating that a series of instruction streams are being repetitively executed; and
   restraining means responsive to said repetitive execution display signal for preventing said write indicating signal from being produced as a branch-history-table enable signal, wherein said branch history table is updated only once for a given repetitive execution.

* * * * *